(12) United States Patent
Lee

(10) Patent No.: US 11,415,860 B2
(45) Date of Patent: Aug. 16, 2022

(54) CAMERA MODULE

(71) Applicant: LG INNOTEK CO., LTD., Seoul (KR)

(72) Inventor: Jun Taek Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 299 days.

(21) Appl. No.: 16/624,049

(22) PCT Filed: Jun. 19, 2018

(86) PCT No.: PCT/KR2018/006875
§ 371 (c)(1),
(2) Date: Dec. 18, 2019

(87) PCT Pub. No.: WO2019/004643
PCT Pub. Date: Jan. 3, 2019

(65) Prior Publication Data
US 2020/0192187 A1    Jun. 18, 2020

(30) Foreign Application Priority Data

Jun. 27, 2017    (KR) .......................... 10-2017-0081081

(51) Int. Cl.
*G03B 5/04*        (2021.01)
*G03B 13/36*       (2021.01)
(Continued)

(52) U.S. Cl.
CPC ............... *G03B 5/04* (2013.01); *G03B 13/36* (2013.01); *H02K 41/0354* (2013.01);
(Continued)

(58) Field of Classification Search
CPC .. G03B 5/04; G03B 13/36; G03B 2205/0023; G03B 2205/0076; G03B 3/10; G03B 2205/0007; G03B 2205/0069; G03B 5/00; G03B 19/22; G03B 17/12; G03B 19/07; H02K 41/0354; H02K 41/0356; H04N 5/2253; H04N 5/2254; H04N 5/2252
See application file for complete search history.

(56) References Cited

U.S. PATENT DOCUMENTS

2011/0097062 A1*  4/2011  Tsuruta ............... G02B 27/646
                                                    396/55
2011/0176046 A1*  7/2011  Hu ........................ G03B 3/10
                                                    348/335
(Continued)

FOREIGN PATENT DOCUMENTS

CN        102466847 A     5/2012
CN        106101494 A    11/2016
(Continued)

*Primary Examiner* — Abdelaaziz Tissire
(74) *Attorney, Agent, or Firm* — Birch, Stewart, Kolasch & Birch, LLP

(57) ABSTRACT

The present embodiment relates to a camera module comprising: a movable element; a lens coupled to the movable element; a first substrate fixed to the bottom surface of the movable element; an image sensor disposed on the first substrate; a second substrate disposed below the first substrate; and a wire for connecting the second substrate to the movable element, wherein at least a part of the wire is made of a shape memory alloy.

20 Claims, 8 Drawing Sheets

(51) Int. Cl.
*H04N 5/225* (2006.01)
*H02K 41/035* (2006.01)

(52) U.S. Cl.
CPC ......... *H04N 5/2253* (2013.01); *H04N 5/2254* (2013.01); *G03B 2205/0023* (2013.01); *G03B 2205/0076* (2013.01)

(56) References Cited

U.S. PATENT DOCUMENTS

| | | | | |
|---|---|---|---|---|
| 2012/0106936 | A1* | 5/2012 | Lim | H04N 5/2257 396/55 |
| 2012/0120513 | A1 | 5/2012 | Kotanagi et al. | |
| 2012/0224075 | A1* | 9/2012 | Lim | G03B 5/02 348/208.11 |
| 2012/0249868 | A1* | 10/2012 | Kamatani | G02B 7/08 348/374 |
| 2013/0033639 | A1* | 2/2013 | Iwafuchi | H01L 27/14618 348/372 |
| 2014/0055630 | A1* | 2/2014 | Gregory | H04N 5/23258 348/208.2 |
| 2014/0055670 | A1* | 2/2014 | Hongo | H04N 5/2253 348/374 |
| 2015/0286109 | A1* | 10/2015 | Park | G03B 5/00 396/529 |
| 2015/0365568 | A1* | 12/2015 | Topliss | H02K 41/0356 348/360 |
| 2016/0209670 | A1* | 7/2016 | Brown | H04N 5/2328 |
| 2016/0216529 | A1* | 7/2016 | Park | G02B 7/08 |
| 2016/0320585 | A1 | 11/2016 | Park et al. | |

FOREIGN PATENT DOCUMENTS

| | | |
|---|---|---|
| JP | 5653678 B2 | 1/2015 |
| KR | 10-2012-0051584 A | 5/2012 |
| KR | 10-1245146 B1 | 3/2013 |
| KR | 10-2015-0101671 A | 9/2015 |
| KR | 10-2016-0131368 A | 11/2016 |
| KR | 10-2017-0001988 A | 1/2017 |

* cited by examiner

CAMERA MODULE

CROSS REFERENCE TO RELATED APPLICATIONS

This application is the National Phase of PCT International Application No. PCT/KR2018/006875, filed on Jun. 19, 2018, which claims priority under 35 U. S. C. 119(a) to Patent Application No. 10-2017-0081081, filed in the Republic of Korea on Jun. 27, 2017, all of which are hereby expressly incorporated by reference into the present application.

TECHNICAL FIELD

The present embodiment relates to a camera module.

BACKGROUND ART

The following description provides background information for the present embodiment and does not describe the prior art.

As various portable terminals are widely spread and commonly used, and wireless Internet services has been commercialized, the demands of consumers related to portable terminals have been diversified and various kinds of additional devices have been installed in portable terminals.

Among them, there is a camera module for photographing a subject as a photograph or a moving picture. Meanwhile, in recent years, a dual camera module in which camera modules are disposed side by side has been studied.

However, in the dual camera module of the prior art, there is a problem that mutual magnetic field interference occurs between the camera modules.

DETAILED DESCRIPTION OF THE INVENTION

Technical Subject

The present embodiment is intended to provide a camera module that does not generate magnetic interference even when used in a dual camera module.

In addition, it is intended to provide a camera module of a new structure having an OIS function that can be used even in a single camera module not a dual camera module.

Technical Solution

A camera module according to the present embodiment comprises: a movable element; a lens coupled to the movable element; a first substrate fixed to the bottom surface of the movable element; an image sensor disposed on the first substrate; a second substrate disposed below the first substrate; and a wire for connecting the second substrate to the movable element, wherein at least a part of the wire may be made of a shape memory alloy.

The movable element comprises: a voice coil motor and a spacer disposed on an upper surface of the voice coil motor, wherein the spacer comprises a body portion disposed on the upper surface of the voice coil motor, and a protruding portion protruding from the body portion, wherein the protruding portion comprises a first extending portion extending from the body portion, and a second extending portion extending wider than the first extending portion at the end of the first extending portion, and wherein the wire may be coupled to the first extending portion of the spacer.

Both ends of the wire is fixed to the second substrate, the center portion of the wire may be bent and caught on the first extending portion of the spacer.

The camera module further comprises a first housing disposed on the second substrate and accommodating the voice coil motor, and a ball disposed between the voice coil motor and the first housing, wherein the first housing comprises four side portions, and the ball may be disposed at least one on each of the four side portions of the first housing.

It may comprise a plurality of coil springs having one end disposed on the first substrate and the other end disposed on the second substrate.

The camera module further comprises a upper plate comprising an opening, a first cover comprising a lateral plate extending from the upper plate, wherein the lateral plate of the first cover is disposed on the second substrate, and the first housing is disposed in the first cover.

The voice coil motor may comprise: a second cover comprising a upper plate comprising an opening and a lateral plate extending from the upper plate; a bobbin disposed in the second cover and coupled to the lens; a coil disposed on the bobbin; a magnet disposed between the coil and the lateral plate of the second cover and facing the coil; an elastic member coupled to the bobbin; and a base disposed below the bobbin and coupled to the lateral plate of the second cover.

The movable element comprises four lateral surfaces and four corner portions disposed between the four lateral surfaces, wherein the wire is disposed at each of the four corner portions of the movable element, and wherein each of the wires disposed at the four corner portions of the movable element may not be electrically connected to another wire.

The camera module further comprises a fixing member for fixing the both ends of the wire to the second substrate, wherein the fixing member may comprise a body in the shape of a plate and two holes formed in the body and through which both ends of the wire pass, respectively.

The movable element comprises a lens holder coupled to the lens and a spacer disposed on an upper surface of the lens holder, wherein the lens holder and the spacer may be integrally formed.

A camera module according to the present embodiment comprises: a movable element; a lens coupled to the movable element; a first substrate fixed to the bottom surface of the movable element; an image sensor disposed on the first substrate; a second substrate disposed below the first substrate; and a wire for connecting the second substrate to the movable element, wherein when a current is applied to the wire, the shape of at least part of the wire may be changed so that the movable element, the lens, the first substrate, and the image sensor are integrally moved with respect to the second substrate.

The camera module according to the present embodiment comprises a movable unit; a lens coupled to the movable unit; a first substrate fixed to the bottom surface of the movable unit; an image sensor disposed on the first substrate; a second substrate disposed below the first substrate; and a wire comprising a fixing portion fixed to the second substrate and a coupling portion extending from the fixing portion and coupled to the movable unit, wherein the wire may comprise a shape memory alloy.

The fixing portion is formed at both ends of the wire, the coupling portion is formed at a center portion of the wire, and the center portion of the wire may be bent and coupled to the movable unit.

The movable unit comprises a voice coil motor, a spacer disposed on an upper surface of the voice coil motor, the spacer comprises a body portion disposed on an upper surface of the voice coil motor, a protruding portion protruding from the body portion, the protruding portion comprises a first extending portion extending from the body portion, and a second extending portion extending wider than the first extending portion at an end of the extending portion, wherein the coupling portion of the wire may be caught on the first extending portion of the spacer and coupled thereto.

The movable unit comprises four lateral surfaces and four corner portions disposed between the four lateral surfaces, wherein the wire is disposed at each of the four corner portions of the movable unit, and wherein each of the wires disposed at the four corner portions of the movable unit may not be electrically connected to another wire.

It may comprise a plurality of coil springs whose one end is disposed on the first substrate and the other end is disposed on the second substrate.

The camera module comprises a first housing disposed on the second substrate and accommodating the voice coil motor, and a ball disposed between the voice coil motor and the first housing, wherein the first housing comprises four side portions, and the ball may be disposed at least one on each of the four side portions of the first housing.

The camera module further comprises a upper plate comprising an opening, a first cover comprising a lateral plate extending from the outer circumference of the upper plate, wherein the lateral plate of the first cover may be disposed on the second substrate.

A fixing member coupled to the fixing portion of the wire may be disposed on the second substrate, and the fixing member may comprise a body in the shape of a plate and two holes disposed on the body and accommodating both ends of the wire, respectively.

The voice coil motor may comprise: a second housing; a bobbin disposed inside the second housing and coupled to the lens; a coil disposed in the bobbin or the second housing; a magnet disposed between the bobbin and the second housing and facing the coil; an elastic member coupled to the second housing and the bobbin; a base disposed below the second housing; and a second cover disposed on the base and accommodating the second housing therein.

The movable unit comprises a lens holder coupled to the lens and a spacer disposed on an upper surface of the lens holder, wherein the lens holder and the spacer may be integrally formed.

The camera module according to the present embodiment comprises: a movable unit; a lens coupled to the movable unit; a first substrate fixed to the bottom surface of the movable unit; an image sensor disposed on the first substrate; a second substrate disposed below the first substrate; and a wire comprising a fixing portion fixed to the second substrate and a coupling portion extending from the fixing portion and coupled to the movable unit, wherein the shape of the wire is changed when a current is applied so that the movable unit, the lens, the first substrate, and the image sensor may be integrally moved toward the second substrate.

Advantageous Effects

Through the present embodiment, magnetic interference can be prevented even when two OIS modules (OIS-capable camera modules) are disposed adjacent to each other in a dual camera module.

BEST MODE

Figure 1:
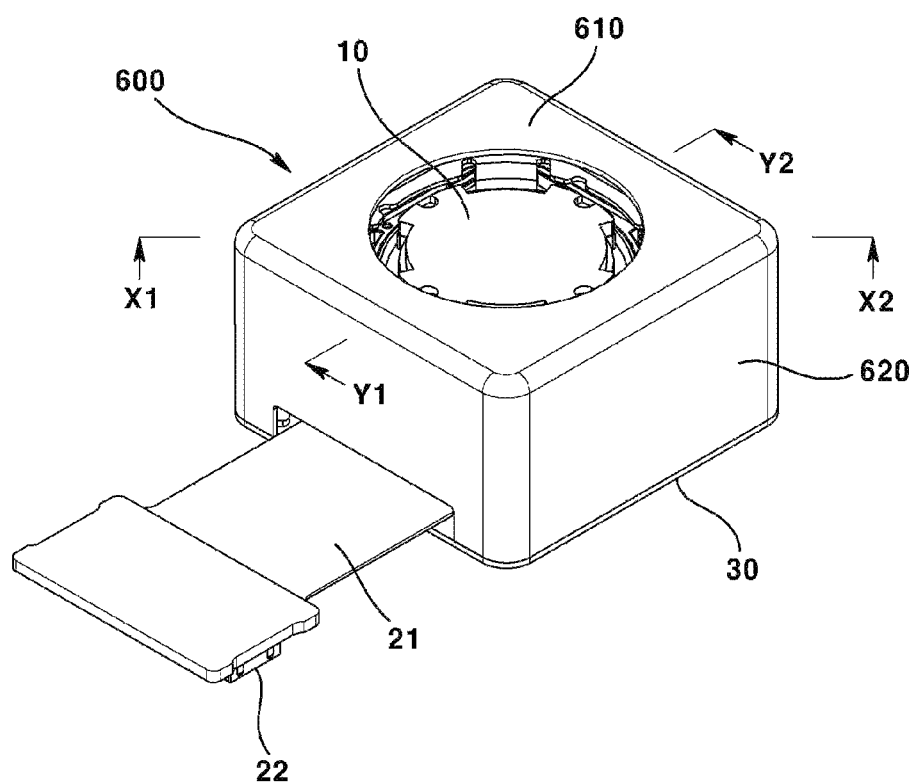
FIG. 1 is a perspective view of a camera module according to the present embodiment (first embodiment).

Hereinafter, some embodiments of the present invention will be described through exemplary drawings for the convenience of description. However, the technical idea of the present invention is not limited to some embodiments described.

In describing the components of the embodiment of the present invention, terms such as first, second, A, B, (a), and (b) may be used. These terms are merely intended to distinguish the components from other components, and the terms do not limit the nature, order or sequence of the components.

When a component is described as being "connected" or "coupled" to other component, the component may be directly connected or coupled to the other component, however, it should be understood that another component may be "connected" or "coupled" between the component and the other component.

"Optical axis direction" as used below is defined as the optical axis direction of the lens coupled to the lens driving device. On the other hand, the "optical direction" may correspond to the "up-down direction", "z-axis direction" and the like.

The "auto focus function" as used hereinafter is defined as the ability to automatically focus on the subject by moving the lens in the direction of the optical axis according to the distance of the subject so that a clear image of the subject can be obtained on the image sensor. Meanwhile, "auto focus" may be interchangeably used with "AF".

Hereinafter, the configuration of an optical device according to the present embodiment will be described with reference to the drawings.

The optical device may be any one among a mobile phone, a mobile phone, a smart phone, a portable smart device, a digital camera, a laptop computer, a digital broadcast terminal, a personal digital assistants (PDA), a portable multimedia player (PMP). However, the type of the optical device is not limited thereto, and any device for taking images or photographs may be included in the optical device.

The optical device may comprise a main body. The main body can form the outer appearance of the optical device. The main body can accommodate the camera module. A display section may be disposed on one surface of the main body. For example, the display unit and the camera module may be disposed on one surface of the main body and the camera module may be additionally disposed on the other surface (the surface located opposite to the one surface) of the main body.

The optical device may comprise a display unit. The display unit may be disposed on one surface of the main body. The display section can output the image photographed by the camera module.

The optical device may comprise a camera module. The camera module may be disposed in the main body. At least a part of the camera module may be accommodated inside the main body. The camera module may be provided in multiple numbers, that is, at least one or more. The camera module may be disposed on one surface of the main body and on each of the other surfaces of the main body. The camera module can take an image of a subject.

The camera module can perform auto focus (AF) function. The camera module can perform an auto focus feedback (AF feedback) control. At this time, the camera module may be referred to as a 'closed loop auto focus (CLAF) camera module'. The camera module can perform optical image stabilization (OIS) function. At this time, the camera module may be referred to as an 'OIS module'. The camera module can perform the optical image stabilization feedback control. The camera module according to the present embodiment can be applied to both of the two camera modules of the dual camera module or to any one of the camera modules. The present embodiment relates to a module tilt actuator using a shape memory alloy (SMA).

Hereinafter, the configuration of the camera module according to the present embodiment will be described with reference to the drawings.

Figure 2:
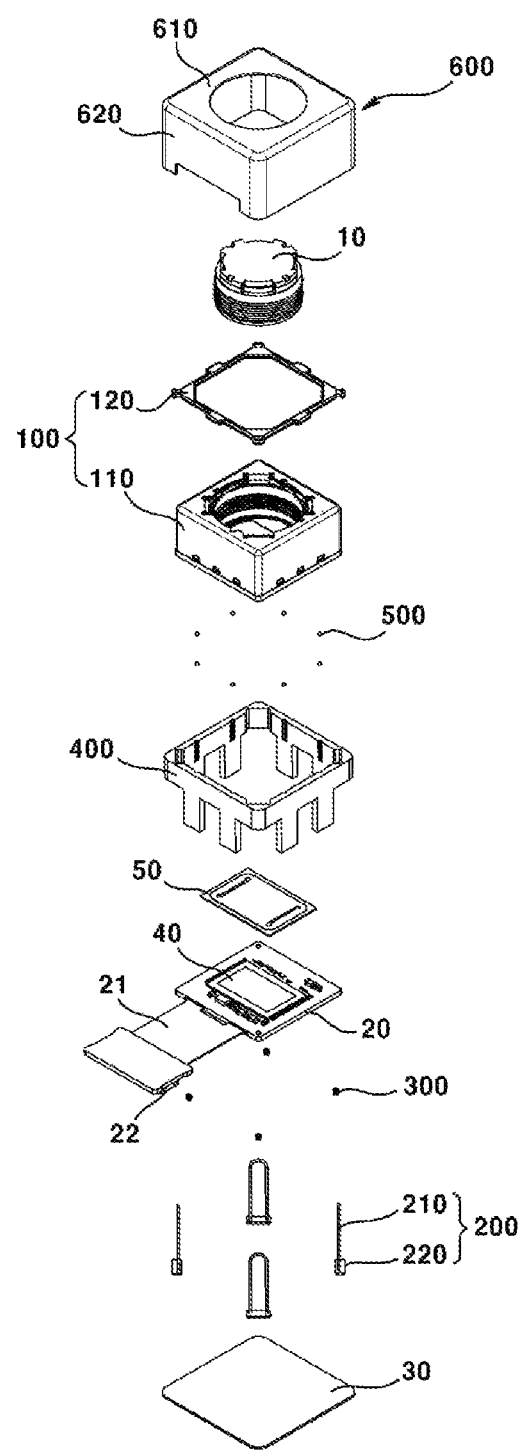
FIG. 2 is an exploded perspective view of the camera module according to the present embodiment.
Figure 3:
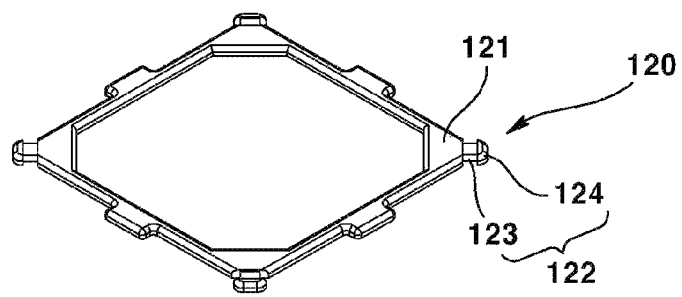
FIGS. 3 and 4 are exploded perspective views of some components of the camera module according to the present embodiment.
Figure 3:
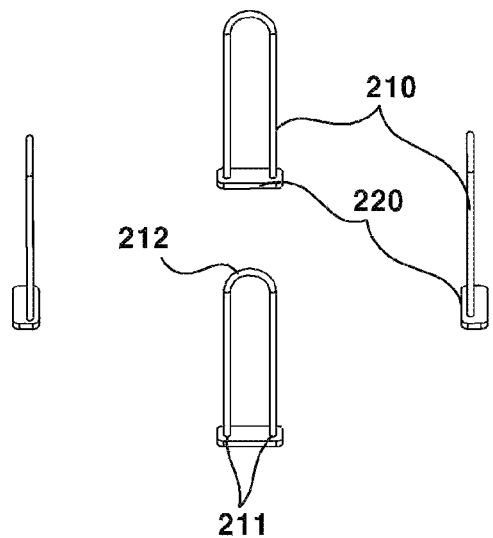
Figure 4:
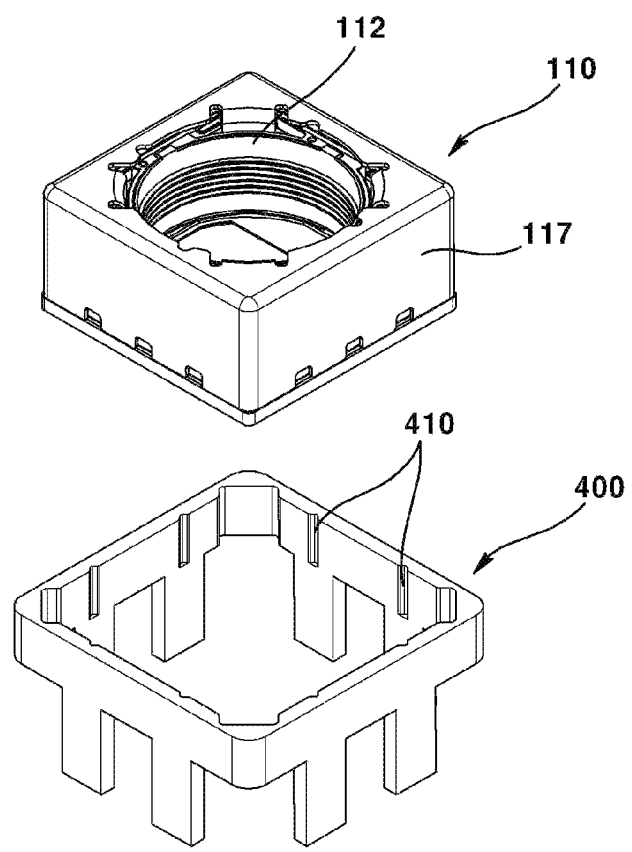
Figure 5:
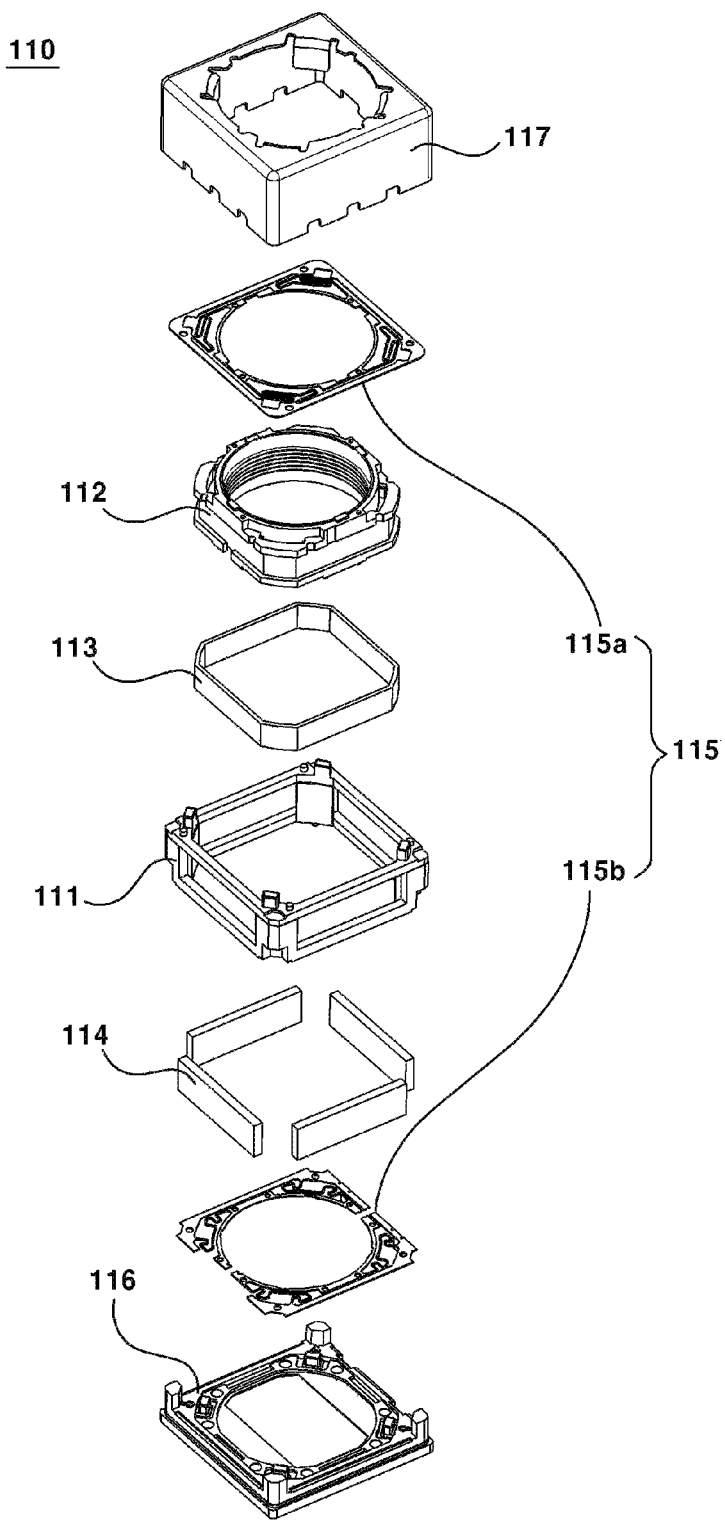
FIG. 5 is an exploded perspective view of the voice coil motor of the camera module according to the present embodiment.
Figure 6:
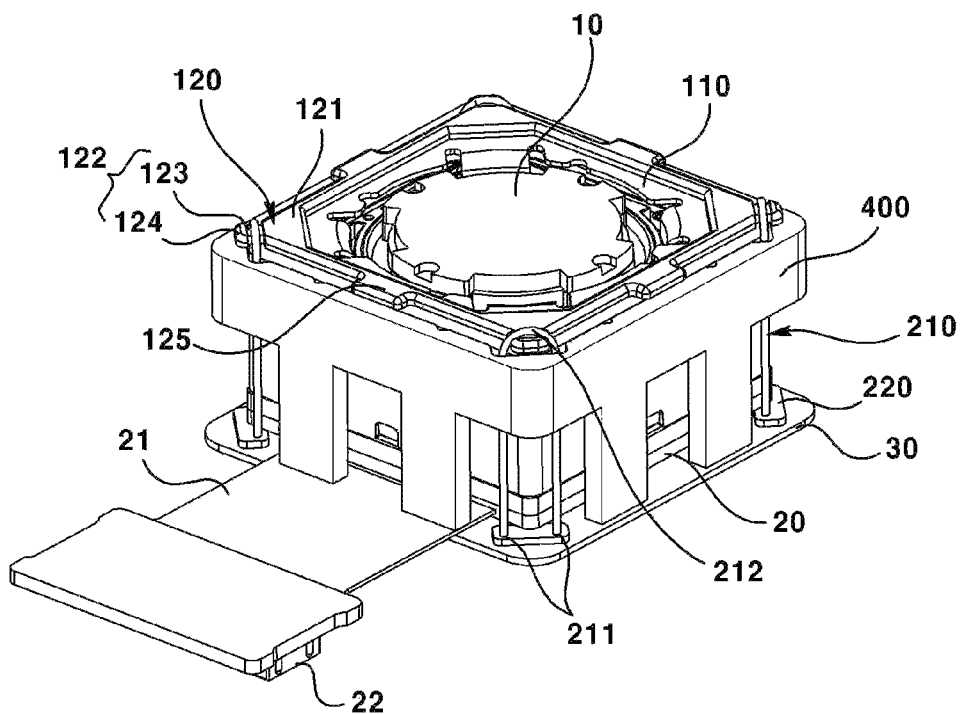
FIG. 6 is a perspective view illustrating a state in which the cover is removed from a camera module according to the present embodiment.
Figure 7:
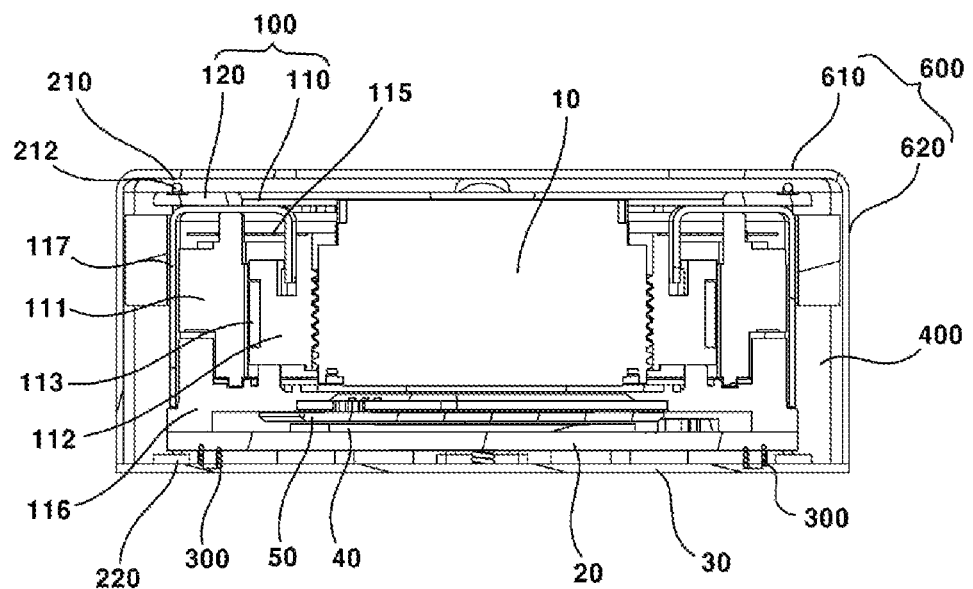
FIG. 7 is a cross-sectional view taken from line X1-X2 of FIG. 1.
Figure 8:
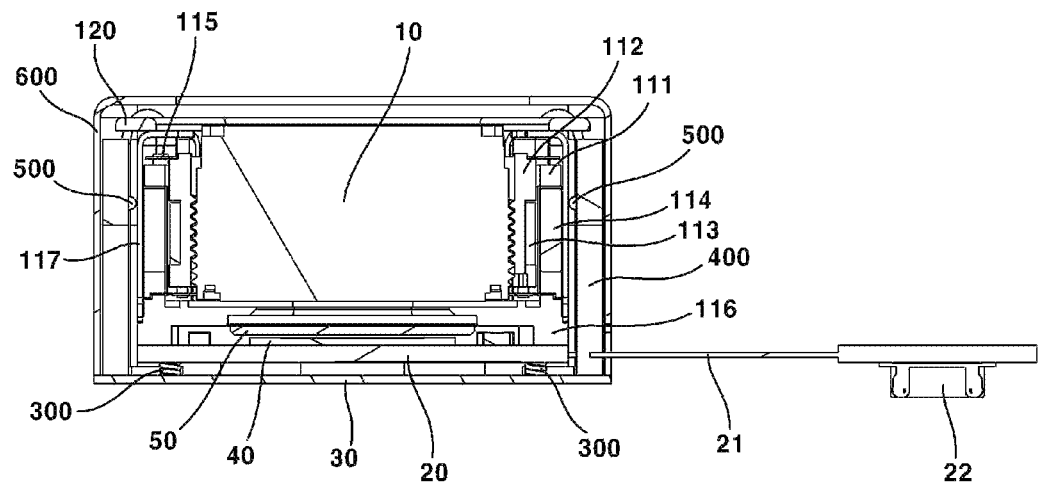
FIG. 8 is a cross-sectional view taken from line Y1-Y2 of FIG. 1.
Figure 10:
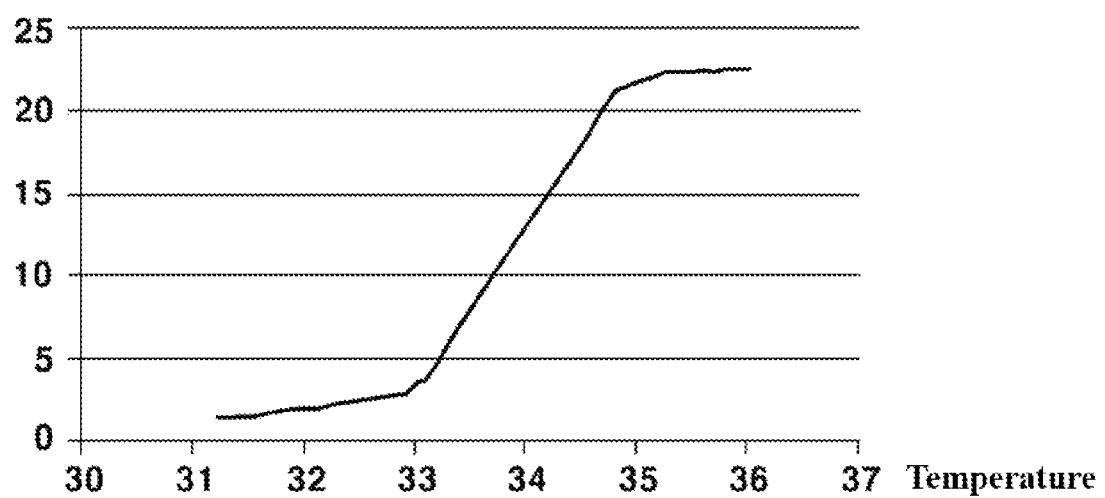
FIG. 10 is a graph showing the change in the length of the shape memory alloy wire with temperature.

FIG. 1 is a perspective view of a camera module according to the present embodiment (first embodiment); FIG. 2 is an exploded perspective view of the camera module according to the present embodiment; FIGS. 3 and 4 are exploded perspective views of some components of the camera module according to the present embodiment; FIG. 5 is an exploded perspective view of the voice coil motor of the camera module according to the present embodiment; FIG. 6 is a perspective view illustrating a state in which the cover is removed from a camera module according to the present embodiment; FIG. 7 is a cross-sectional view taken from line X1-X2 of FIG. 1; FIG. 8 is a cross-sectional view taken from line Y1-Y2 of FIG. 1; and FIG. 10 is a graph showing the change in the length of the shape memory alloy wire with temperature.

The camera module may comprise a lens module. The lens module may comprise at least one lens 10. The lens module may comprise a lens 10 and a barrel. The lens module may be coupled to a bobbin 112 of a voice coil motor 110. The lens module may be coupled to the bobbin 112 by screw-coupling and/or adhesive. The lens module may be moved integrally with the bobbin 112. The lens 10 may be coupled to the bobbin 112 and disposed above an image sensor 40. The lens 10 may be coupled to a movable unit 100.

The camera module may comprise a sensor substrate 20 (hereinafter referred to as a "first substrate"). The voice coil motor 110 may be disposed on the sensor substrate 20. In this case, a base 116 and a separate sensor base may be disposed between the sensor substrate 20 and the voice coil motor 110. The sensor substrate 20 may be electrically connected to the voice coil motor 110. The image sensor 40 may be disposed on the sensor substrate 20. The sensor substrate 20 may be electrically connected to the image sensor 40. The sensor substrate 20 may be fixed to the bottom surface of the movable unit 100. The sensor substrate 20 may be fixed to the bottom surface of the voice coil motor 110.

The camera module may comprise a connector 22 coupled to an external component, and a connecting portion 21 connecting the sensor substrate 20 and the connector 22. The connector 22 may be coupled to one component of optics. The connecting portion 21 may be a flexible printed circuit board (FPCB).

The camera module may comprise a support substrate 30 (hereinafter referred to as a "second substrate"). The support substrate 30 may be disposed below the sensor substrate 20. The support substrate 30 may be used for power application. The support substrate 30 may be electrically connected to a wire 210. The support substrate 30 may be provided for mounting the movable unit 100 and the sensor substrate 20.

The camera module may comprise an image sensor 40. The image sensor 40 may be disposed on the sensor substrate 20. The image sensor 40 can be electrically connected to the sensor substrate 20. In one example, the image sensor 40 may be coupled to the sensor substrate 20 by surface mounting technology (SMT). As another example, the image sensor 40 may be coupled to the sensor substrate 20 by a flip chip technique. The image sensor 40 can be disposed so that the lens 10 and the optical axis coincide. That is, the optical axis of the image sensor 40 and the optical axis of the lens 10 can be aligned. The image sensor 40 can convert the light irradiated to the effective image area of the image sensor 40 into an electrical signal. The image sensor 40 may be any one among a charge coupled device (CCD), a metal oxide semiconductor (MOS), a CPD, and a CID.

The camera module may comprise a filter 50. The filter 50 may comprise an infrared filter. The infrared filter can block the light of the infrared region from entering the image sensor 40. The infrared filter may be disposed between the lens 10 and the image sensor 40. The infrared filter may be disposed in the base 116. As a modified embodiment, the infrared filter may be disposed in the sensor base disposed between the voice coil motor 110 and the sensor substrate 20.

The camera module may comprise the movable unit 100. The movable unit 100 may be a "mover". The movable unit 100 may be coupled with a driving unit 200. The movable unit 100 may be moved by the driving unit 200. At this time, "movement" may include "tilting". The movable unit 100 may be moved integrally with the sensor substrate 20 and the image sensor 40 disposed on the sensor substrate 20. The movable unit 100 may comprise four lateral surfaces and four corner portions disposed between the four lateral surfaces. The movable unit 100 may be disposed on the sensor substrate 20.

The movable unit 100 may comprise a voice coil motor 110. The voice coil motor 110 may be coupled with the lens 10. The voice coil motor 110 may move the coupled lens 10 along the optical axis direction. Since the optical axis direction movement of the lens 10 corresponds to AF driving from the viewpoint of the camera module, the voice coil motor 110 may be referred to as an "AF module". However, the AF module is included in the movable unit 100 only as an example, and as a modified embodiment, the movable unit 100 may simply be configured of only the lens 10 and the barrel.

The voice coil motor 110 may comprise a housing 111 (hereinafter referred to as a "second housing"). However, the housing 111 may be omitted. In this case, a magnet 114 may be coupled to the inner surface of the lateral plate of a cover 117 by an adhesive. The housing 111 may be disposed outside the bobbin 112. The housing 111 can accommodate the bobbin 112 therein. The housing 111 may be disposed inside the cover 117. The housing 111 may be disposed between the cover 117 and the bobbin 112. The housing 111 may be formed of a material different from that of the cover 117. The housing 111 may be formed of an insulating material. The housing 111 may be formed of an injection molded product. The magnet 114 may be disposed in the housing 111. The housing 111 and the magnet 114 may be coupled by an adhesive. An upper elastic member 115a may be coupled to the upper surface or upper portion of the housing 111. A lower elastic member 115b may be coupled to the bottom surface or the lower portion of the housing 111. The housing 111 may be coupled to the elastic member 115 by thermal fusion welding and/or adhesive. The housing 111 may comprise four side portions and four corner portions disposed between the four side portions.

The voice coil motor 110 may comprise a bobbin 112. The bobbin 112 may be disposed inside the housing 111. The bobbin 112 may be coupled with the lens 10. The bobbin 112 may be disposed inside the housing 111. The bobbin 112 may be disposed to move in a first direction inside the housing 111. In this case, the first direction may be an optical axis direction. The bobbin 112 may be disposed in the hole of the housing 111. The bobbin 112 may be movably coupled to the housing 111. The bobbin 112 may be moved in the optical axis direction with respect to the housing 111. The lens 10 may be coupled to the bobbin 112. The bobbin 112 and the lens 10 may be coupled by screw-coupling and/or adhesive. The coil 113 may be coupled to the bobbin 112. The upper elastic member 115a may be coupled to the upper surface or the upper portion of the bobbin 112. The lower elastic member 115b may be coupled to the bottom surface or bottom portion of the bobbin 112. The bobbin 112 may be coupled to the elastic member 115 by thermal fusion welding and/or adhesive.

The voice coil motor 110 may comprise a coil 113. The coil 113 may be disposed in the bobbin 112. As a modified embodiment, the coil 113 may be disposed in the housing 113. The coil 113 may face the magnet 114. The coil 113 may be disposed in the bobbin 112. The coil 113 may be disposed between the bobbin 112 and the housing 111. The coil 113 may be disposed on an outer circumferential surface of the bobbin 112. The coil 113 may be directly wound around the bobbin 112. Alternatively, the coil 113 may be coupled to the bobbin 112 in a directly wound state. The coil 113 may face the magnet 114. The coil 113 may electromagnetically interact with the magnet 114. In this case, when a current is supplied to the coil 113 an electromagnetic field is formed around the coil 113, and then the coil 113 can be moved against the magnet 114 by the electromagnetic interaction between the coil 113 and the magnet 114. The coil 113 may be integrally formed.

The voice coil motor 110 may comprise a magnet 114. The magnet 114 may face the coil 113. The magnet 114 may be disposed between the bobbin 112 and the housing 111. The magnet 114 may be disposed in the housing 111. As a modified embodiment, the magnet 114 may be disposed on the bobbin 112. The magnet 114 may be disposed in the cover 117. The magnet 114 may be disposed in the housing 111. The magnet 114 may be fixed to the housing 111 by an adhesive. The housing 111 may be omitted, and the magnet 114 may be coupled to an inner surface of the lateral plate of the cover 117. The magnet 114 may be disposed between the bobbin 112 and the housing 111. The magnet 114 may face the coil 113. The magnet 114 may electromagnetically interact with the coil 113. The magnet 114 can be used for AF driving. The magnet 114 may be disposed on the side portion of the housing 111. In this case, the magnet 114 may be a flat plate magnet in the shape of a flat plate. As a modified embodiment, the magnet 114 may be disposed at the corner portion of the housing 111 or the corner portion of the cover 117. At this time, the magnet 114 may be a corner magnet in the shape of a hexahedron whose inner lateral surface is wider than the outer lateral surface.

The voice coil motor 110 may comprise an elastic member 115 (hereinafter referred to as a "second elastic member"). The elastic member 115 may be coupled to the housing 111 and the bobbin 112. The elastic member 115 may elastically support the bobbin 112. The elastic member 115 may have elasticity at least in part. The elastic member 115 may movably support the bobbin 112. The elastic member 115 may support the movement of the bobbin 112 during AF driving.

The elastic member 115 may comprise an upper elastic member 115a coupled to the upper portion or upper surface of the bobbin 112, and a lower elastic member 115b coupled to the bottom portion or bottom surface of the bobbin 112.

The voice coil motor 110 may comprise a base 116. The base 116 may be disposed below the housing 111. The base 116 may be disposed below bobbin 112. The base 116 may be disposed below the housing 111. The base 116 may be coupled with the cover 117. The base 116 may be disposed above the sensor substrate 20. The bottom surface of the base 116 and the upper surface of the sensor substrate 20 may be coupled by an adhesive.

The voice coil motor 110 may comprise a cover 117 (hereinafter referred to as a "second cover"). The cover 117 may be disposed on the base 116. The cover 117 may be nonmagnetic material. The cover 117 may comprise an inner yoke. The cover 117 may be coupled with the base 116. The cover 117 may accommodate the housing 111 therein. The cover 117 may form an appearance of the voice coil motor 110. The cover 117 may be in the shape of a hexahedron with a bottom surface opened. The cover 117 may be formed of a metal material. In this case, the cover 117 may be referred to as a "cover can". The cover 117 may be formed by bending a metal plate. The cover 117 may be connected to the ground portion of the sensor substrate 20. Through this, the cover 117 may be grounded (earthed). The cover 117 may block electromagnetic interference (EMI). In this case, the cover 117 may be referred to as an "EMI shield can".

The movable unit 100 may comprise a spacer 120. The spacer 120 may be disposed on an upper surface of the voice coil motor 110. The spacer 120 may be fixed to the voice coil motor 110. The spacer 120 may be coupled to the wire 210. The spacer 120 may be moved integrally with the coupling portion 212 of the wire 210. The spacer 120 may be pressed toward the support substrate 30 through the wire 210.

In the present embodiment, the spacer 120 may be included on an upper surface of the voice coil motor 110 so as to hang the wire 210. On the other hand, in the coupling structure of the wire 210 through the spacer 120 can connect the wire 210 as long as possible. If the SMA wire 210 is used frequently so that more than 3% of the total length is deformed, there is a problem that the SMA's own properties will be changed, therefore it is necessary to use in a way that the deformation shall be within 2% so as to ensure an infinite lifetime. Therefore, the spacer 210 structure that can use the wire 210 as long as possible as in the present embodiment is advantageous for securing the lifetime of the SMA wire 210. In the present embodiment, since the length of the wire 210 is 10 mm, a vertical deformation of 10*0.02/2=0.1 mm can be used in the wire 210. In this case, the tilt angle of the movable unit 100 may be about 1.5 degrees. In this embodiment, the length of the wire 210 may be 8 to 12 mm. In addition, the tilt angle of the movable unit 100 may be 1.3 degrees to 1.7 degrees.

The spacer 120 may comprise a body portion 121. The body portion 121 may be disposed on an upper surface of the voice coil motor 110. The body portion 121 may be fixed to the voice coil motor 110. The body portion 121 may comprise an opening that exposes the lens 10. The body portion 121 may be formed of a frame in the shape of a rectangle. A protruding portion 122 may be disposed at each of the four corner portions of the body portion 121. Protrusions 125 may be disposed on each of the four side portions of the body portion 121.

The spacer 120 may comprise a protruding portion 122. The protruding portion 122 may be protruded from the body portion 121. The protruding portion 122 may be disposed at the corner portion of the body portion 121. The protruding portion 122 may be extended inclinedly from the body portion 121. The protruding portion 122 may be extended upward and outward from the body portion 121. The coupling portion 212 of the wire 210 may be coupled to the protruding portion 122. The protruding portion 122 may be overlapped with a housing 400 in the optical axis direction. The protruding portion 122 may function as a stopper so that the spacer 120 does not descend below the upper surface of the housing 400 even when the spacer 120 is tilted through the wire 210.

The protruding portion 122 may comprise a first extending portion 123. The first extending portion 123 may be extended from the body portion 121. The first extending portion 123 may be formed to have a narrower width than the second extending portion 124. Through such a structure, the coupling portion 212 of the wire 210 may be coupled in such a manner as to be caught by the first extending portion 123. In other words, the coupling portion 212 of the wire 210 disposed on the first extending portion 123 is caught by the body portion 121 on the inner side and caught by the second extending portion 124 on the outer side so that it may not be separated from the first extending portion 123.

The protruding portion 122 may comprise a second extending portion 124. The second extending portion 124 may be extended to have a wider width than the first extending portion 123 at the end of the first extending portion 123. The second extending portion 124 may be extended to have a thicker thickness than the first extending portion 123. The second extending portion 124 may have a longer length in the vertical direction and the horizontal direction than the first extending portion 123. The second extending portion 124 may prevent the coupling portion 212 of the wire 210 disposed on the first extending portion 123 from being separated outward.

The spacer 120 may comprise a protrusion 125. The protrusion 125 may be protruded from the body portion 121. The protrusion 125 may be disposed on the side portion of the spacer 120. The protrusion 125 may be overlapped with the housing 400 in the optical axis direction. The protrusion 125 may be functioned as a stopper for limiting the lower limit of the spacer 120 when the spacer 120 is moved. As the bottom surface of the protrusion 125 is in contact with the top surface of the housing 400, downward movement of the spacer 120 may be limited.

In the present embodiment, the movable unit 100 may comprise a simple lens holder (not shown) instead of the voice coil motor 110. In this case, the camera module does not have an AF function and only the OIS function may be performed by the SMA wire 210. In addition, when the movable unit 100 is a simple lens holder, the lens holder and the spacer 120 may be integrally formed.

The camera module may comprise a driving unit 200. The driving unit 200 may tilt the movable unit 100. The driving unit 200 may be used to drive the lens 10 with optical image stabilization (OIS). The driving unit 200 may move the movable unit 100. The driving unit 200 may move the movable unit 100 and the sensor substrate 20 integrally. The driving unit 200 may be fixed to the support substrate 30. The driving unit 200 may be electrically connected to the support substrate 30. The driving unit 200 may be driven by receiving power from the support substrate 30.

The driving unit 200 may comprise a wire 210. The wire 210 may comprise a shape memory alloy (SMA). The wire 210 may be formed of a shape memory alloy, partially or entirely. In this case, the wire 210 may be referred to as an "SMA wire". The wire 210 may have the characteristics to restore to a memorized shape at a specific temperature. The wire 210 may be changed in shape and/or length when the temperature inside thereof changes. The wire 210 may be changed in shape and/or length when a current is supplied. The wire 210 may be extended from the support substrate 30 and be connected to the support substrate 30 again. In this embodiment, when the current inside the SMA wire is raised to raise the temperature inside the SMA wire, the voice coil motor 110 is tilted by using the property of the SMA wire tending to return to its original shape (original length).

In the present embodiment, when a current is applied the shape of the wire 210 is changed so that it may move or tilt the movable unit 100, the lens 10, the sensor substrate 20, and the image sensor 40 integrally toward the support substrate 30.

The wire 210 may be disposed at each of the four corner portions of the movable unit 100. Each of the wires 210 disposed at four corner portions of the movable unit 100 may not be electrically connected to another wire 210. The wire 210 may be provided in four. The wire 210 may comprise first to fourth wires spaced apart from each other. The first to fourth wires may not be electrically connected to each other. In some embodiments, however, the first and third wires disposed in the diagonal direction are electrically connected to each other, the second and fourth wires are electrically connected to each other, and the first and third wires may not be electrically connected to the second and fourth wires. In this embodiment, the x-axis tilt and the y-axis tilt can be individually controlled through the plurality of wires 210 which are not electrically connected to each other.

In this embodiment, as shown in FIG. 10, there is a portion (33 degrees to 35 degrees temperature range) that changes linearly with temperature in the temperature range in which the SMA returns to its original length, which is the area that can be used for OIS driving of the camera module. Conceiving the idea that the resistance is varying linearly, the z-axis displacement value can be adjusted through 1:1 matching of the z-axis displacement value and the resistance value according to the tilting. This has the advantage that no additional position sensor attachment is necessary.

In the present embodiment, the length control of the SMA wire 210 can be performed. The internal temperature of the wire 210 may be controlled by applying a current to the wire 210. The resistance of the wire 210 can be measured. The resistance measurement value of the wire 210 may be reflected in the calculation of the OIS driving amount (z-axis displacement value due to tilting).

The wire 210 may connect the support substrate 30 and the movable unit 100. Both ends of the wire 210 may be fixed to the support substrate 30. In this case, a portion between both ends of the wire 210 may be coupled to the movable unit 100. In more detail, a portion between both ends of the wire 210 may be coupled in such a manner that it is caught by the movable unit 100. The wire 210 may perform OIS driving by tilting the movable unit 100 through changing the shape thereof.

The wire 210 may comprise a fixing portion 211. The fixing portion 211 may be fixed to the support substrate 30. The fixing portion 211 may be formed at both ends of the wire 210. As a modified embodiment, the fixing portion 211 may be formed at a portion other than both ends of the wire 210. However, in both of the above embodiments, the distance between each of the two fixing portions 211 and the coupling portion 212 may be the same. In more detail, when each of the two fixing portions 211 are referred to as the first fixing portion and the second fixing portion, the distance between the first fixing portion and the coupling portion 212 may be the same as the distance between the second fixing portion and the coupling portion 212.

The wire 210 may comprise a coupling portion 212. The coupling portion 212 may be extended from the fixing portion 211. The coupling portion 212 may be coupled to the movable unit 100. The coupling portion 212 may be formed at the center portion of the wire 210. In this case, the center portion of the wire 210 may be bent and coupled to the spacer 120 of the movable unit 100. As the center portion of the wire 210 is bent, the wire 210 may have an approximately "U" shape. The coupling portion 212 may be coupled to the first extending portion 123 of the protruding portion 122 of the spacer 120. The coupling portion 212 may be disposed so as to surround the upper surface and both lateral surfaces of the first extending portion 123 of the spacer 120 and the bottom surface of the first extending portion 123.

The driving unit 200 may comprise a fixing member 220. The fixing member 220 may be disposed on the support substrate 30. The fixing member 220 may be coupled to the fixing portion 211 of the wire 210. The fixing member 220 may comprise two holes. Both ends of the wire 210 may be fixed to two holes of the fixing member 220. The fixing member 220 may comprise a body in the shape of a plate and two holes disposed in the body and accommodating both ends of the wire 210.

The camera module may comprise an elastic member 300 (hereinafter referred to as a "first elastic member"). The elastic member 300 may be disposed to apply the restoring force of the movable unit 100. The elastic member 300 may be disposed between the sensor substrate 20 and the support substrate 30. The elastic member 300 may support the sensor substrate 20 against the support substrate 30. The elastic member 300 may comprise a coil spring. One end of the coil spring may be disposed on the sensor substrate 20 and the other end may be disposed on the support substrate 30. In the present embodiment, when electricity is removed after electricity is applied to the SMA wire 210, the movable unit 100 can be immediately moved by the elastic member 300 to the initial position (position of the movable unit 100 before electricity is applied to the SMA wire 210).

In the present embodiment, the elastic member 300 may be applied to secure a space in which the voice coil motor 110 can move between the support substrate 30 and the sensor substrate 20. The elastic member 300 also has a restoring effect of the movable unit 100 tilted by the SMA wire 210.

In this embodiment, the elastic member 300 may serve to elongate the SMA wire 210 that has been returned (shortened in length) to its original shape (memorized shape). Although the characteristic values of the SMA wires 210 may be different, in the present embodiment, there may be a 3:1 difference between the force that will change to a memorized shape according to temperature and the force that can deform the SMA. In this embodiment, by applying the elastic member 300 having a spring stiffness smaller than the restoring force of the wire 210 but greater than the force that can deform the wire 210, the wire 210 may be linearly controlled on the same principle as the Lorentz force-spring restoring force of the voice coil motor 110.

The camera module may comprise a housing 400 (hereinafter referred to as "first housing"). The housing 400 may be disposed on the support substrate 30. The housing 400 may be fixed to the support substrate 30. The housing 400 can accommodate the voice coil motor 110 therein. The housing 400 may be disposed outside the voice coil motor 110. The housing 400 may comprise four side portions.

The housing 400 may comprise a groove 410. The groove 410 may be formed on an inner lateral surface of the housing 400. A ball 500 may be disposed in the groove 410. The groove 410 may accommodate at least a portion of the ball 500. The width of the groove 410 may correspond to the diameter of the ball 500.

The camera module may comprise a ball 500. The ball 500 may be disposed between the voice coil motor 110 and the housing 400. The ball 500 may guide the movement of the voice coil motor 110, which is a movable member, with respect to the housing 400, which is a member fixed to the support substrate 30. At least one ball 500 may be disposed on each of the four side portions of the housing 400. Two balls 500 may be disposed on each of the four side portions of the housing 400. In this case, a total of 8 balls 500 may be provided.

In the present embodiment, the ball 500 may minimize shaking in the left and right direction (horizontal direction, x-axis/y-axis direction) with respect to the housing 400 of the movable unit 100. In the present embodiment, the coil spring, which is an example of the elastic member 300, is weak in left and right shake, and thus a ball guide structure for preventing left and right shake may be applied. In the present embodiment, a support structure through the ball 500 may be applied between the voice coil motor 110 and the housing 400 for the ball guide structure.

The camera module may comprise a cover 600 (hereinafter referred to as a "first cover"). The cover 600 may be nonmagnetic. The cover 600 may be disposed on the support substrate 30. The cover 600 may accommodate the housing 400 therein. The cover 600 may form an outer appearance of the camera module. The cover 600 may have the shape of a hexahedron with a bottom surface opened. The cover 600 may be formed of a metal material. In this case, the cover 600 may be referred to as a "cover can". The cover 600 may be formed by bending a metal plate. The cover 600 may be connected to the ground portion of the support substrate 30. Through this, the cover 600 may be grounded (earthed). The cover 600 may block electromagnetic interference (EMI). In this case, the cover 600 may be referred to as an "EMI shield can".

The cover 600 may comprise an upper plate 610. The cover 600 may comprise a lateral plate 620. The upper plate 610 may comprise an opening. The lateral plate 620 may be extended from the periphery or edge of the upper plate 610. The lateral plate 620 may be disposed on the support substrate 30.

Hereinafter, the configuration of a camera module according to a modified embodiment will be described with reference to the drawings.

Figure 9:
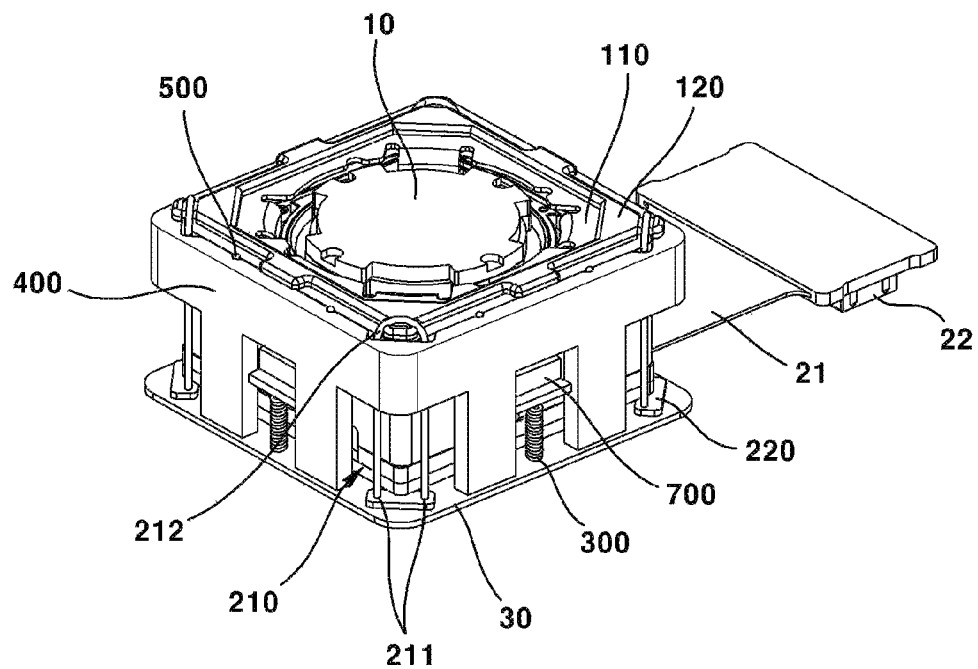
FIG. 9 is a perspective view showing a state in which the cover is removed from a camera module according to a modified embodiment (second embodiment).

FIG. 9 is a perspective view showing a state in which the cover is removed from a camera module according to a modified embodiment (second embodiment).

The modified embodiment has a difference in the position of the ball 500, the position of the elastic member 300, the presence or absence of the support portion 700 when compared with the present embodiment. In more detail, in the present embodiment and modified embodiment, it is the same that the ball 500 is disposed between the voice coil motor 110 and the housing 400, but in the present embodiment, the ball 500 is disposed inside and is not visible from the outside, in a modified embodiment, the ball 500 may be disposed to be visible from above. In the present embodiment, the elastic member 300 is disposed between the sensor substrate 20 and the support substrate 30, but the elastic member 300 may be disposed between the support substrate 30 and the support portion 700.

In a modified embodiment, the camera module may comprise a support portion 700. The support portion 700 may be formed on the outer periphery (outer circumference) of the voice coil motor 110 to support the coil spring which is an example of the elastic member 300. However, the support portion 700 may be replaced by the bottom surface of the sensor substrate 20 as in the first embodiment.

In the above, to have been described as all the components that make up the embodiments of the present invention may operate in combination, or combined into one, the present invention is not necessarily limited to all the components of the embodiments. That is, the present invention may comprise one or more of all the components of the embodiments and be operated through these components. In addition, the term "comprise" described above means that the corresponding components can be embedded unless there is an opposite description therefore it should be interpreted that other components may further be comprised in addition to those corresponding components. All terms, including technical and scientific terms, have the same meaning as commonly understood by one of ordinary skill in the art to which this invention belongs, unless otherwise defined. Commonly used terms, such as predefined terms, should be interpreted to be consistent with the contextual meanings of the related art, and are not to be construed as ideal or excessively formalistic, unless expressly defined to the contrary.

The above description is only to those described as the technical idea of the present invention by way of example, those skilled in the art that various modifications, additions and substitutions will be possible without departing from the essential characteristics of the present invention. Accordingly, the disclosed invention embodiments is for illustrative and not intended to limit the technical idea of the present invention, not by such an embodiment is the technical scope of the present invention is not limited. The scope of protection of the invention is to be interpreted by the following claims, all spirits within a scope equivalent will be construed as included in the scope of the present invention.

The invention claimed is:

1. A camera module comprising:
    a movable element comprising a voice coil motor and a spacer disposed on an upper surface of the voice coil motor;
    a lens coupled to the movable element;
    a first substrate fixed to a lower surface of the movable element;
    an image sensor disposed on the first substrate;
    a second substrate disposed below the first substrate; and
    a wire connecting the second substrate to the movable element,
    wherein at least a part of the wire is made of a shape memory alloy,
    wherein the spacer comprises a body portion disposed on the upper surface of the voice coil motor, and a protruding portion protruding from the body portion,
    wherein the protruding portion comprises a first extending portion extending from the body portion, and a second extending portion extending wider than the first extending portion at a distal end of the first extending portion, and
    wherein the wire is coupled to the first extending portion of the spacer.

2. The camera module of claim 1, wherein opposite ends of the wire are fixed to the second substrate, a center portion of the wire is bent to be hung on the first extending portion of the spacer.

3. The camera module of claim 2, comprising:
    a fixing member fixing the opposite ends of the wire to the second substrate,
    wherein the fixing member comprises a body having a plate shape and two holes formed on the body and through which the opposite ends of the wire pass, respectively.

4. The camera module of claim 1, comprising:
    a first housing disposed on the second substrate and accommodating the voice coil motor; and
    a ball disposed between the voice coil motor and the first housing,
    wherein the first housing comprises four lateral portions, and the ball is disposed on each of the four lateral portions of the first housing.

5. The camera module of claim 4, comprising:
    a plurality of coil springs having one end disposed on the first substrate and the other end disposed on the second substrate.

6. The camera module of claim 5, wherein the voice coil motor is disposed to be tiltable with respect to the second substrate, and
    wherein the one end of each of the plurality of coil springs is disposed on a support portion coupled to the first substrate.

7. The camera module of claim 4, comprising:
    a first cover comprising an upper plate comprising an opening, and a lateral plate extending from the upper plate,
    wherein the lateral plate of the first cover is disposed on the second substrate, and the first housing is disposed in the first cover.

8. The camera module of claim 4, wherein the voice coil motor comprises:
a second cover comprising an upper plate comprising an opening and a lateral plate extending from the upper plate;
a bobbin disposed in the second cover and coupled to the lens;
a coil disposed on the bobbin;
a magnet disposed between the coil and the lateral plate of the second cover and facing the coil;
an elastic member coupled to the bobbin; and
a base disposed below the bobbin and coupled to the lateral plate of the second cover.

9. The camera module of claim 1, wherein when a current is applied to the wire, a shape of at least a part of the wire is changed so that the movable element, the lens, the first substrate, and the image sensor integrally move with respect to the second substrate.

10. The camera module of claim 1, comprising:
a first housing disposed on the second substrate and covering the voice coil motor; and
a ball disposed between the voice coil motor and the first housing,
wherein the ball connects the first housing and the voice coil motor.

11. The camera module of claim 10, wherein the spacer comprises a protrusion protruding from the body portion and spaced apart from the protruding portion, and
wherein at least a portion of the protrusion is overlapped with the first housing in an optical axis direction.

12. The camera module of claim 10, wherein the first housing comprises a groove formed on an inner lateral surface of the first housing,
wherein the ball is disposed on the groove of the first housing, and
wherein the groove of the first housing is opened at an upper surface of the first housing.

13. An optical apparatus, comprising the camera module of claim 1.

14. The camera module of claim 1, wherein the protruding portion comprises first to fourth protruding portions formed on first to fourth corners of the body portion, respectively,
wherein the wire comprises first to fourth wires corresponding with the first to fourth protruding portions, and
wherein each of the first to fourth wires is not electrically connected to other wires of the first to fourth wires.

15. The camera module of claim 14, wherein the second substrate comprises an upper surface facing the first substrate and comprising first to fourth corner areas corresponding to first to fourth corners of the body portion, and
wherein the first wire is hung on the first protruding portion of the spacer and comprises opposite ends fixed to the first corner area of the second substrate.

16. A camera module comprising:
a movable element comprising a voice coil motor and a spacer disposed on an upper surface of the voice coil motor;
a lens coupled to the movable element;
a first substrate fixed to a lower surface of the movable element;
an image sensor disposed on the first substrate;
a second substrate disposed below the first substrate; and
a wire connecting the second substrate and the movable element,
wherein when a current is applied to the wire, a shape of at least a part of the wire is changed so that the movable element, the lens, the first substrate, and the image sensor integrally move with respect to the second substrate,
wherein the spacer comprises a body portion disposed on the upper surface of the voice coil motor, and a protruding portion protruding from the body portion,
wherein the protruding portion comprises a first extending portion extending from the body portion, and a second extending portion extending wider than the first extending portion at a distal end of the first extending portion, and
wherein the wire is coupled to the first extending portion of the spacer.

17. The camera module of claim 16, wherein at least a part of the wire is made of a shape memory alloy.

18. The camera module of claim 16, wherein opposite ends of the wire are fixed to the second substrate, a center portion of the wire is bent to be hung on the first extending portion of the spacer.

19. The camera module of claim 16, comprising:
a first housing disposed on the second substrate and accommodating the voice coil motor; and
a ball disposed between the voice coil motor and the first housing,
wherein the first housing comprises four lateral portions, and the ball is disposed on each of the four lateral portions of the first housing.

20. The camera module of claim 16, wherein the protruding portion comprises first to fourth protruding portions formed on first to fourth corners of the body portion, respectively,
wherein the wire comprises first to fourth wires corresponding with the first to fourth protruding portions, and
wherein each of the first to fourth wires is not electrically connected to other wires of the first to fourth wires.

* * * * *